INVENTORS
ARTHUR WALLACE EVANS &
JAMES DENNIS GROVES
BY
Oscar L Spencer
ATTORNEY

United States Patent Office 3,086,843
Patented Apr. 23, 1963

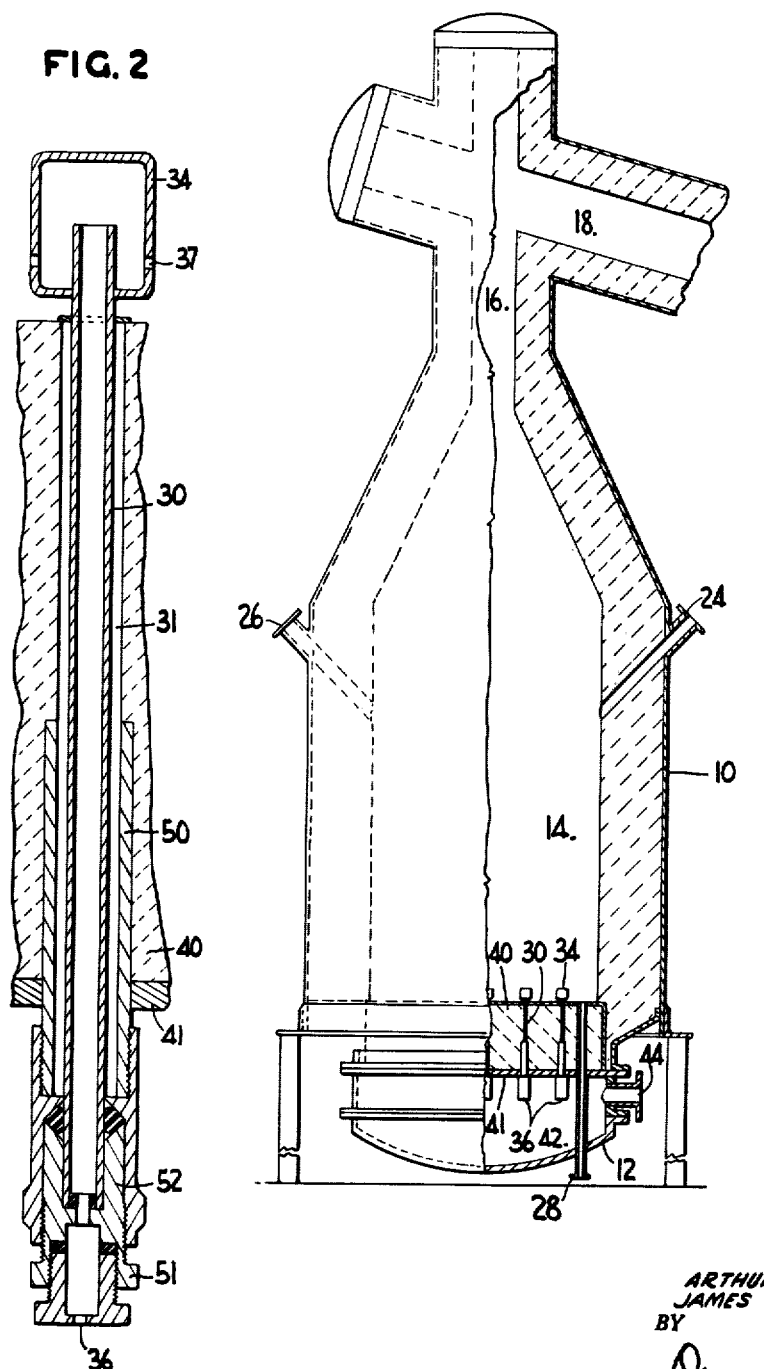

3,086,843
METHODS FOR THE PRODUCTION OF TITANIUM TETRACHLORIDE
Arthur W. Evans, Nunthorpe, Middlesbrough, and James D. Groves, Stockton-on-Tees, England, assignors to British Titan Products Company Limited, Billingham, England, a company of Great Britain
Filed Apr. 4, 1957, Ser. No. 650,766
7 Claims. (Cl. 23—87)

The present invention relates to the preparation of titanium tetrachloride. Titanium tetrachloride may be produced by the chlorination of an iron-titanium bearing material. One of the most effective methods of producing the tetrahalide involves the reaction of a titaniferous material with chlorine gas in a shaft furnace in the presence of a carbonaceous reducing agent. The reaction is autothermal, i.e., the exothermic heat of reaction is at least sufficient to maintain the reaction in a continuous operation. Titaniferous materials, such as ilmenite and rutile, are the preferred sources of titanium in reactions of this type.

One of the most desirable techniques used in conjunction with a shaft furnace is the method of establishing a bed of the titanium ore and a carbonaceous material, such as carbon, coke or anthracite, and passing upwardly therethrough a stream of chlorine gas whereby the bed is maintained in a fluidized or dynamic state. In other words, the titanium material is suspended partially or completely in an upwardly-flowing stream of a chlorinating gas. When the velocity of the chlorinating gas is sufficiently high the resulting bed of reacting material is highly turbulent and has many of the fluid characteristics of a boiling liquid. Because of the movement of the particles in the bed, substantially uniform temperature tends to be established throughout the depth of the bed.

While the fluid bed technique has many desirable advantages, nevertheless, one of the more serious difficulties heretofore encountered is the appearance of a significant amount of unreacted chlorine in the off-gases. Quite obviously, the successful operation of the dynamic bed technique requires efficient utilization of the reactants, particularly the chlorine gas.

According to the present invention, it is possible to operate with substantially no loss of chlorine gas. Pursuant to the present discovery, a fluidized bed of an iron-titanium bearing material in an upwardly-rising stream of chlorine is established and the temperature of the bed maintained sufficiently high to cause formation and vaporization of titanium tetrachloride and an iron chloride, which resulting vapors escape from the bed. Periodically, these vapors are analyzed for free chlorine and the rate of flow of chlorine into the bed is maintained such that there is substantially no free chlorine in the vapors from the bed.

The instant discovery, therefore, involves establishing a fluidized bed of a material containing iron and titanium in oxide form and a member of the group consisting of zircon and silica by means of an upwardly-rising stream of chlorine, maintaining the temperature of the bed sufficiently high to cause chlorination of the material and to form and vaporize iron and titanium chlorides and to cause a gradual increase in the content of a member of the above group. The rate of flow of chlorine introduced into the bed is low enough that there is substantially no free chlorine in the vapors escaping from the bed. As stated above, periodic analyses of vapors from the bed are made to determine free chlorine therein. Chlorination is stopped before the free chlorine content in the vapors from the bed exceeds five (5) percent by volume of the total vapor.

According to a specific embodiment of the present invention, chlorine gas is passed upwardly through a titaniferous ore-coke bed of predetermined height to completely react with the titanium at temperatures between 880 and 915° C., the bed being maintained in a dynamic or fluidized state. The concentration of the coke in the reactor is between 10 and 50 percent by weight of the bed when rutile ore, for instance, containing better than 90 percent $TiO_2$ by weight is employed.

It has been found according to the present invention that periodic purging of the bed prevents the occurrence of unreacted chlorine in the off-gases. For example, when analysis of the bed content discloses a $TiO_2$ concentration of less than about 30 percent by weight, preferably less than about 50 percent by weight, up to about ⅓ or more of the bed is removed and the bed reconstituted to the predetermined bed height with fresh feed. The predominant unreacted constituents of the purged residual are zirconium, silica and calcium, as well, of course, as interspersed coke and $TiO_2$.

A coolant is introduced into the reactor at a point above the bed in order to control the reaction temperaure. Since the self-sustaining, exothermic reaction tends to drift to temperatures above the desirable range, it is very advantageous to cool with, say, a metal halide, such as titanium tetrachloride.

While the instant embodiment teaches the introduction of coolant into the reactor at a point above the bed, other sites may be employed if desired. For instance, the coolant may be fed into the bed at a point below the surface of the bed with advantage.

It will be obvious from the detailed description and the specific embodiments which are to follow that the present invention affords a unique, continuous operation wherein the reaction conditions are so correlated as to afford complete chlorine consumption and substantially increased continuous operating time. By the methods defined herein the efficacy of continuous chlorination of titaniferous materials is greatly enhanced, especially from an economic viewpoint. For instance, it is now possible to operate at lower, controlled temperatures, thus significantly reducing the mechanical breakdowns heretofore encountered, particularly with respect to overheated furnace refractory walls. These and many other advantages will be apparent from the description given hereinafter.

When a gas is passed through a bed of solid material, several types of conditions can be established depending upon the velocity of the gas. Where the gas velocity is low, the bed of solids remains static and the gas simply passes through the pores of the bed. As the gas velocity is increased, some or all of the particles become suspended in the upwardly-flowing gas stream and are thus in more or less constant movement. This results in expansion of the bed and the bed consequently expands in height. Beds which are expanded by such flow of gas from the height which they exhibit in static state may be termed "dynamic beds."

With further increase in the velocity of gases, all of the particles become suspended and expansion of the bed increases with increasing velocity, thereby increasing the average distance between the suspended particles. At the higher velocities, the bed is highly turbulent and has many of the characteristics of a boiling liquid.

In the production of a fluidized or dynamic bed, it will be understood that there is a minimum velocity of upwardly flowing gas at which such bed can be fluidized. This velocity depends upon a number of things, including particle size, density of fluidizing gas, and density of solid particle. Wilhelm and Kwauk, Chemical Engineering Progress, volume 44, page 201 (1948), states that the minimum fluidizing velocity may be approximately determined according to the following equation:

$$Re = \frac{abc}{e} \text{ and } \frac{a^3 cg}{2e^2}(d-c) = k$$

where $Re$ = the Reynolds number
$a$ = diameter of the particle being fluidized
$b$ = minimum fluidizing velocity
$c$ = density of the fluidizing gas
$d$ = density of the solid particle being fluidized
$e$ = viscosity of the gas effecting fluidization
$g$ = acceleration due to gravity
$k$ = a constant At 900° C., chlorine has a density of 0.00074 gram per cc. and a viscosity of 0.00049 poise. The density of a solid particle of rutile is 4.2 grams per cc.

In a typical case where the diameter of the particle is 130 microns or 0.013 centimeter and $g$ is 981 centimeters per second per second, the constant $k$ may be computed as follows:

$$\frac{k}{\Delta p} = \frac{(0.013)^3 \times 0.00074 \times 981}{(0.00049)^2 \times 2}(4.2 - 0.00074) = 10.5$$

From the graph on page 215 of the Wilhelm and Kwauk article, the Reynolds number is $3 \times 10^{-2}$ and thus the minimum fluidizing velocity for this particle at 900° C. is about 2 centimeters per second. This corresponds to a mass velocity of about 12 pounds of chlorine per hour per square foot of reactor cross-section. It is also possible to determine the approximate minimum fluidizing velocity for a particular bed by laboratory experiment.

Chlorination of titanium and like metal oxide bearing ores may be effected readily by conducting the chlorination while suspending a titanium oxide bearing material having a particle size of 75 to 500 microns in a fluidized bed comprising elemental chlorine, and introducing the elemental chlorine into the bed at a rate at least three times, but not in excess of about 50 times, the minimum velocity required to fluidize the titanium oxide or other metal oxide bearing material in the bed. Thus, it has been found that where the chlorine is introduced at a rate less than three times the minimum fluidizing velocity of the bed, only 90 percent or less of the chlorine introduced is converted to metallic chloride. In contrast, when the rate of chlorine introduction exceeds about three times the minimum fluidizing velocity, but not in excess of about 50 times the minimum fluidizing velocity, chlorine utilization is much higher, and, by following the teachings of the present invention, complete consumption of the chloride is realized, there being substantially no free chlorine in the exit gases.

In the practice of this process it is important to effect the chlorination of titanium oxide or like metal oxide bearing materials which have a particle size in the range of about 75 to 500 microns, preferably having an average particle size of about 75 to 200 microns, as supplied to the chlorination zone. The exact rate of flow of chlorine into the bed for optimum operation depends to an appreciable degree upon the temperature of the reaction zone. For example, where the average particle size of titanium-bearing material supplied to the reactor is approximately 130 microns and the temperature is 900° C., optimum efficiency of chlorination is achieved when the rate of chlorine introduction is approximately 100 pounds per hour per square foot of cross-section of reaction zone. On the other hand, where the temperature is allowed to fall to 800° C., optimum chlorination is effected at approximately 60 pounds of chlorine per hour per square foot of reaction zone.

It will be understood that the minimum velocity of chlorine which is required to be introduced in order to effect fluidization of particles having an average particle size in the range of 75 to 200 microns is in the range of about 12 pounds per hour per square foot of cross-sectional area of bed. Thus, the rate of chlorine introduction into the fluidizing bed should exceed about 36 pounds per hour per square foot but rarely should be in excess of about 200 to 250 pounds per hour per square foot. Control of the rate of flow of chlorine into the reactor is adjusted within this general range so that there is substantially no chlorine, i.e., less than 0.05 percent chlorine by volume in the exit gases escaping from the reactor during 75 to 90 percent or more of the period of reaction.

In order to achieve maximum utilization of chlorine in the chlorine or like chlorinating gas in a fluidized bed, it is necessary to perform the fluidization of the bed under conditions such that uniform chlorination takes place throughout the bed, and consequent escape of chlorine gas due to non-uniformity of the bed is avoided. This is not a difficult procedure where the cross-sectional diameter of the bed is relatively small, for example 12 inches or less. On the other hand, where the diameter of the bed becomes large, serious escape of chlorine or other chlorinating gas can occur because of such nonuniformity. At the same time, the large scale production of titanium tetrachloride requires the use of reactors of substantial cross-sectional diameter, usually exceeding 3 feet and frequently being as much as 10 feet or more. Avoidance of local irregularity in the density of the bed in such cases becomes exceedingly difficult.

It has been found that the irregularity in the density of the bed may be minimized and chlorine utilization may be improved in beds of such substantial diameter by introducing the chlorine from a header or other common source into the lower portion of the fluidized bed through a distributor extending across the reaction zone, which may comprise a porous bed or a distributor having a plurality of orifices or channels, in which substantial pressure drop takes place as the chlorine passes therethrough. This pressure drop is in excess of 2 pounds per square inch, generally in the range of 6 to 12 pounds per square inch. The chlorinating gas supplied to such orifices is at a superatmospheric pressure in excess of that of the surrounding atmosphere by the sum of the pressure drop across the bed and the pressure drop across the distributor channels or orifices. Thus, the gas is so supplied at a gauge pressure of at least about 3 pounds per square inch. The gas also may be supplied to the orifices or other distributor at higher pressures, rarely above 100 pounds per square inch gauge.

Especially good results may be achieved by proper correlation of the pressure drop across the orifices or like distributor with the pressure drop across the bed. Thus, it will be understood that the pressure drop of the chlorinating gas across the bed will depend to a large degree upon the density and the depth of the bed. When the character of the material undergoing chlorination is substantially uniform, a convenient manner of controlling the pressure drop across the bed is to control its depth. Best results are achieved when the depth of the bed is correlated with the pressure drop across the orifices so that the ratio of the pressure drop across the orifice and/or channels to the pressure drop across the bed is not less than one-half, but rarely should be in excess of about 50 to 1. Preferably, the pressure drop across the orifices should exceed the pressure drop across the bed. This may be conveniently accomplished at a pressure drop across the orifices or channels of at least about 2 to 3 p.s.i., when the particles have an average particle range of 75 to 200 microns, by controlling the bed depth within the approximate range of about 4 inches to about 12 feet in depth, the specific depth at any time depending upon the magnitude of the pressure drop across the orifices and/or channels at such time.

This technique, involving establishment of a substantial pressure drop across a plurality of orifices introducing the chlorine into a fluidized bed of material undergoing chlorination, as described above, is especially applicable to the above described embodiment in which titanium oxide bearing ore of particle size ranging from 75 to 250 microns is subjected to chlorination in elemental chlorine flowing at a rate of 3 to 20 times minimum fluidizing velocity. However, such technique may be applied to chlorination of titanium or other metal bearing materials of different particle size and also to the use of other chlorinating gases, such as phosgene, or the like.

It will be understood that the practice of any of the above processes is conducted in a shaft or like furnace which is not externally heated. Thus, in effecting the reaction, the heat evolved in the reaction maintains the temperature of the reaction zone sufficiently high to support the reaction. It will be understood, therefore, that the reaction bed must generate a substantial amount of heat in order to compensate for heat loss due to introduction of reactants as well as heat loss by virtue of radiation, convection, and the like. This is particularly true where the oxide ore is introduced at a temperature below the reaction temperature.

According to a further embodiment, it has been found desirable and advantageous to establish and maintain a fluidized or dynamic bed containing a substantial amount of zircon. This zircon which is maintained in the bed retains a major portion of sensible heat in the bed and serves to dilute the incoming titanium oxide bearing material and transfer heat thereto. As a consequence, it is possible to effect the desired reaction conveniently and without preheating the ore to a temperature equal to or above the temperature of the reaction bed. Furthermore, when the ore contains certain components which tend to cause sintering or agglomeration of the bed particles as, for example, magnesium oxide or the like, the presence of the zircon in the bed may minimize this difficulty.

Where the ore itself contains an appreciable amount of zircon, an especially convenient method of establishing the zircon in concentration in the bed involves operation at temperature conditions such that zircon is not chlorinated. Thus, it has been found that by maintaining the temperature of the bed high enough to chlorinate the titanium components (usually above 700° C. but below about 950° C.), it is possible to build up and establish a substantial concentration of zircon in the bed since chlorination of the zirconium components of the ore undergoing introduction is substantially minimized.

In the practice of the operations herein contemplated, it is desired to make use of a bed containing about 7 to 45 percent by weight of $ZrO_2$ based upon the total composition of the bed (exclusive of the carbon content). However, the composition of the bed should not be allowed to fall below about 30 percent by weight of titanium oxide at all events, basis the total composition of the bed including carbon (coke). The actual composition of the bed will depend to a large degree upon the concentration of titanium dioxide in the oxide bearing material fed to the bed. However, a good range of titanium dioxide content in the bed is from about 50 percent to about 90 percent $TiO_2$ by weight. Silica in concentration ranging from about 3 to 25 percent by weight of the bed usually will be present either as such or in association with the $ZrO_2$. Moreover, as will be seen hereinafter, other components, such as coke, are generally in the bed. The particle size of the zircon in the bed may range from 75 to 500 microns or may be smaller.

To effect the chlorination herein contemplated, special apparatus has been provided. The nature of the apparatus may be more fully understood by reference to the ensuing disclosure taken with the accompanying drawings, in which:

FIG. 1 is a diagrammatic elevational view partially in section of a furnace suitable for the practice of embodiments of the present invention;

FIG. 2 is an enlarged sectional view of one of the chlorine conduits illustrated in FIG. 1;

Figure 3:
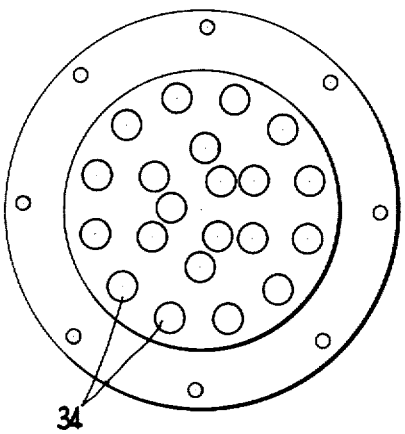
FIG. 3 is a plan view of the distributor illustrated in FIG. 1.

It will be understood that the above embodiments may be utilized individually if desired. In applicant's practice of the invention, applicants have found it desirable to make use of all of these embodiments and thereby to effect production of metallic chlorides, such as titanium tetrachloride, with maximum efficiency and economy.

As shown in the drawing, the furnace in which the reactions herein contemplated may be conducted conveniently may be a shaft furnace having a shaft or reactor section 14, a top section 16, and a bottom or chlorine distributor section 12. The reactor section 14 comprises a shaft lined with refractory brick capable of withstanding the attack of chlorine at the temperature of operation. The internal diameter of such shaft may be of any convenient size and, in commercial operation, normally exceeds about 3 feet. Several outlets 24, 26 and 28 extend through the reactor wall and bottom and provide means for introducing coolants, such as titanium tetrachloride, into the bed, for introducing feed and for purging the bed, respectively.

Disposed in the top section 16 is a vapor outlet duct 18 for removal of vapors resulting from the chlorination of the metal bearing material. Inlets are provided (not shown) into the reactor at several points therein in order to provide access to the interior of the reactor to take bed temperatures, temperatures above the bed and, generally, to afford auxiliary openings into the reactor for various reasons.

The chlorine distributor section 12 is removably attached to the bottom of the reactor section 14 and is designed to provide a uniform supply of chlorinating gas to the bed within the reactor. This section consists of a refractory base 40 which serves as the bottom or floor of the reactor and which rests upon metal plate 41 which in turn is bolted to the bottom of the shaft.

A plurality of spaced gas conduits 30 extend through the plate 41 and the base 40, providing communication between the chlorinating gas header 42 and the interior of the shaft furnace. These conduits are uniformly disposed throughout the base (see FIG. 3) at a convenient spacing, for example, 3 to 15 inches, preferably less than 12 inches, between centers.

Each conduit is provided at its lower end with an orifice 36 which is carefully machined, usually of metal, to provide a substantial pressure drop across the orifice. To achieve substantially uniform flow through each orifice, each should be designed to provide substantially the same pressure drop. At the upper end of each conduit is a head 34 which is closed at the top in order to prevent fall of ore into the conduit and which provides ports 37 in the sides thereof to permit flow of the chlorinating gas into the reaction zone in the shaft furnace.

FIG. 2 illustrates a convenient means for mounting the orifices. As shown therein, there is provided a metal sleeve 50 which is brazed to the plate 41 to provide a gas tight seal. This sleeve extends upwardly a short distance into the refractory base 40. On each such sleeve is a nipple 52 in which a refractory conduit 30 is mounted. This conduit extends through the opening 31 in the refractory 40 and terminates in a hollow head 34 above the top surface of refractory 40. These heads are provided with a plurality of ports 37. In the lower end of nipple 52 there is disposed another nipple 51 into which a plug having an orifice 36 is removably mounted. The various joints are gas tight and thus the header 42 is isolated from the reaction zone except through conduits 30 which in turn are non-porous and therefore essentially gas tight.

In the operation of the process, the furnace is brought up to temperature in any convenient way as, for example, by introducing a bed of coke or other carbonaceous material into the reactor through nozzle 24. The coke is ignited and air or oxygen is blown through the conduits 30 to support combustion and to fluidize the coke. After the temperature of the furnace has been raised to the desired level, usually above 500° C. and preferably 700 to 900° C. and rarely over about 1200 to 1400° C., it is ready for commencement of the chlorination process.

The ore or like material subjected to chlorination is mainly of the order of size 75 to 500 microns, with an average of 100 to 150 microns, and is mixed with powdered carbon, coke, anthracite or equivalent carbonaceous material with an average size of approximately 100 to 900 microns or below, but often having a wide scatter. The percentage of carbon to be added may vary according to other conditions such, for example, as the oxygen content of the chlorine gases fed in, but is usually enough to provide from 10 to 50 percent by weight of the total composition of the bed. Normally, the ore-carbon mixture is blended before feeding to the furnace although separate feeds for each constituent may be used.

To initiate the reaction, a quantity of the ore-carbon mixture is introduced into the furnace in amount sufficient to establish a bed about 1 to 6 feet in height. Chlorine is introduced into the reservoir 42, with or without air or oxygen, and flows through conduits 30 at a rate sufficient to establish a fluidized or dynamic bed.

As explained above, the velocity of the gases to maintain the bed in the required fluid state will vary with the size of the particles. For example, with a mean weight particle size of 130 microns, the velocity necessary to fluidize the particles at 800° C. may range from 2 to 100 centimeters per second. However, for maximum utilization of chlorine as described above, the velocity of the gases preferably should be about 6 to 40 centimeters per second.

The chlorine thus introduced chlorinates metal components of the bed, forming and vaporizing titanium tetrachloride and iron chloride. These chlorides are carried away from the bed and are conducted to a condensation system through duct 18. As a consequence of the chlorination, heat is evolved, thus maintaining the temperature of the bed at reaction temperature.

The reaction can be carried out continuously by feeding further chlorine, ore, and carbon continuously or intermittently to the bed and withdrawing the vapors from the bed. The temperature of the bed may be maintained at a convenient level by controlling the rate of chlorination. When the temperature is low, for example, the rate of chlorine introduced is increased. Ore is introduced at a rate sufficient to maintain a bed at least one foot deep, measured when the bed is static, i.e., with chlorine flow off.

The carbon is introduced at a rate sufficient to maintain a substantial concentration of carbon in the reaction bed. For chlorination of rutile, the optimum concentration is approximately 18–22 percent by weight carbon in the bed. With other ores, such as various ilmenite ores, the optimum concentration may be determined by laboratory experiments, as is understood in the art. However, as stated above, the percentage carbon contemplated herein is usually from 10 to 50 percent by weight, basis the total composition of the bed.

As explained above, it is advantageous to conduct chlorination of titanium-bearing material in a bed which contains a substantial amount of zircon. By maintaining the temperature of the reaction bed below about 950° C. and by supplying as the ore undergoing chlorination a titanium-bearing ore which contains a small amount of zircon, for example, 0.25 to 0.75 percent by weight of zirconium oxide, it is possible to gradually build up a bed which contains in excess of 10 percent by weight of zirconium oxide. If the temperature of the reaction mixture is maintained below 950° C. and the reaction using such an ore is carried out over a long period of time, the titanium dioxide content of the bed falls below 30 to 50 percent by weight. In such a case, chlorination becomes inefficient and thereupon it becomes important to remove a portion of the zircon.

Removal of the zircon may be conducted by a number of methods. For example, the zircon may be removed by withdrawal of a portion of the bed through outlet 28 and adding titanium oxide bearing material to replenish the bed.

According to a further embodiment, it is also possible to reduce the amount of zirconium in the bed by allowing the temperature to rise from time to time above 950° C., for example 950 to 1,150° C. or above (rarely above 1,500° C.). As a consequence of such chlorination, the zirconium components chlorinate and can be reduced to any desired degree. On the other hand, such a high temperature may tend to cause chlorination of the fire brick or other lining of the furnace. Hence, it frequently is desirable to effect chlorination of the zirconium components for only a relatively small portion of the entire reaction period, allowing the zirconium to build up to a maximum, not in excess of about 45 percent zirconium oxide by weight, basis the total composition of the bed (exclusive of the carbon content), and thereupon reducing the zirconium oxide content by raising the temperature or by other removal means until it has fallen to the desired level without interrupting chlorine flow.

To insure accurate and uniform feed of chlorine through the orifices, it is preferable to make use of machined orifices which produce a predetermined pressure drop (or loss in static head), as a consequence of flow therethrough. This is important, as has already been explained, in order to promote uniformity of distribution of chlorine flow over the entire cross-sectional area of the reaction zone. Thus, it becomes important to avoid substantial change in the orifices as the process proceeds from day to day or week to week.

It has been found that such change may be minimized by maintaining the temperature of the orifices below the temperature at which substantial attack of the metal of the orifice by the chlorinating gas can take place. Thus, if the orifice is of iron, the temperature thereof should be maintained below about 250° C., preferably below 200° C. If the orifice is of nickel, the temperature thereof may be somewhat higher, preferably below 600° C. This may be accomplished if the thickness of the base plate 40 is sufficiently great and its heat insulating properties sufficiently high. In such a case, the chlorinating gas supplied to header 42 is supplied at a temperature well below 150° C., usually in the range of 25 to 100° C. or below, and the temperature of the orifices thus remains below 150° C.

The pressure of the chlorinating gas in reservoir 42 normally is superatmospheric. The magnitude of this pressure must be sufficiently high at least to equal the sum of pressure drop across the orifices, the pressure drop across the bed, and the pressure drop due to frictional losses in the conduits. Frequently, the pressure in this header will be as low as 6 to 8 pounds per square inch gauge when the reaction is initiated and may rise to 20 to 25 pounds per square inch gauge or higher after continuous use for a very long period of time.

The overall differential pressure between the interior of the header 42 and the top of the dynamic bed undergoing chlorination also depends upon the depth of the bed. To achieve best efficiency, the depth of the bed is kept low enough so that the pressure drop across the bed itself is not more than about twice the drop across the orifice. Where the drop across the orifice is about 2 to 5 pounds per square inch, the depth of the fluidized bed usually has been kept at about 1 to 6 feet.

After the chlorination proceeds for a long time, plugging of the ports in the heads may proceed to such a degree as to make further operation difficult. In such case the entire distributor 12 may be removed and replaced with a new one. Thereafter, further ore and carbon may be introduced into the furnace and the chlorination process restarted.

Figure 4:
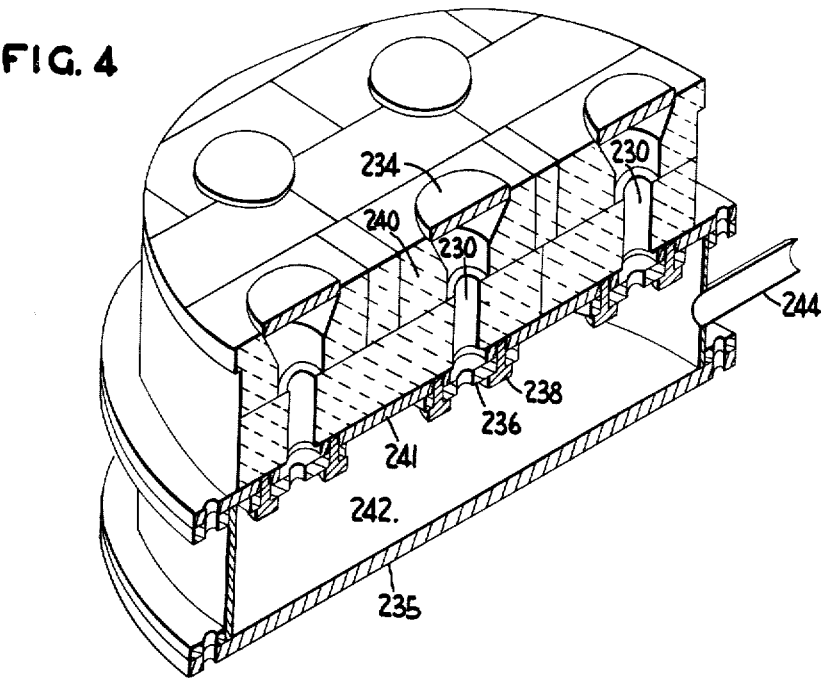
FIG. 4 is a perspective view of an alternative embodiment.

FIG. 4 illustrates a further embodiment of a chlorine distributor which may be used in lieu of the one described above. This distributor comprises a plate 241 fastened to a shell 235, thus providing a gas tight reservoir 242. Refractory base 240 is mounted on plate 241 and is provided with conduits 230 extending therethrough which are closed in their upper ends by porous discs 234 which permit free passage of chlorine therethrough. The lower ends of these conduits 230 are closed by orifice plates 236 fastened to plate 241 by studs 238. Reservoir 242 has a supply inlet 244 for supply of chlorinating gas thereto.

In the practice of the process herein contemplated samples of the vapor escaping from the reactor through outlet duct 18 are taken periodically and analyzed for elemental chlorine. Most of the time no chemical chlorine appears in such vapors, although some chlorine may appear for a short period due to upsets in operation. In any event, there is no chlorine in the vapors during at least 75 to 90 percent of the period of operation.

The period of reaction during which the vapors are essentially free from chlorine, except for the upsets mentioned above, lasts for many days, usually more than one to three weeks. Finally, however, chlorine begins to appear in the vapors as a regular course.

It has been found, according to this invention, that this regular appearance of chlorine in the vapors is a warning that the reaction is not functioning properly and that adjustment is necessary.

The required adjustment may be accomplished by one of several ways. Thus, the titanium oxide content of the fluid bed may be increased to a $TiO_2$ content above 50 percent by weight by purging a portion of the bed from the reactor and replacing the amount purged with fresh feed of ore (rutile, ilmenite, etc.). Also, the temperature of the chlorination may be revised to increase the utilization of chlorine.

For instance, it has been found that the appearance of chlorine in the off-gases may be eliminated, at times, by increasing the rate of chlorine introduction. This has the effect of improving fluidization and increasing the reaction temperature, thus enhancing chlorine consumption.

Similarly, chlorine utilization may be increased, at times, by maintaining the chlorine flow constant while increasing the coke feed rate.

As stated hereinabove, coolant, such as titanium tetrachloride, is introduced into the reactor at a point above the bed to reduce the reaction temperature when it exceeds a predetermined maximum. According to a specific embodiment of the present invention, it is very often desirable to maintain the temperature just above the bed at about 900° C. At a chlorine flow rate of about 2800 pounds per hour through a bed about 4½ feet high and 7 feet in diameter, which bed is continuously fed at the rate of about 2000 pounds of rutile per hour and 375 pounds per hour of coke, approximately 1200 pounds of titanium tetrachloride is required per hour as coolant.

However, depending upon the fluidization conditions and the concentration of residue in the bed, the rate of addition of coolant to the bed may vary from 0 to about 2000 pounds per hour. This amount is adjusted in accordance with the analyses of the exit gases from the system to determine their chlorine content, the amount of coolant introduced being held at a minimum so long as the temperature of the reaction bed does not rise substantially and chlorine does not appear in the exit gases. When chlorine does begin to appear the rate of coolant introduction may be reduced and the reaction temperature allowed to rise.

Maximum chlorine consumption is realized by maintaining the $TiO_2$ concentration of the bed above 30 percent by weight, preferably above 50 percent by weight, basis the total composition of the bed including carbon. Consequently, by periodically purging up to a third or more of the bed whenever the $TiO_2$ concentration dips below about 50 percent by weight and replenishing the bed with fresh feed, complete consumption of the chlorine fed to the reaction is realized. In addition, a continuously efficient reaction is assured.

It has been discovered, also, quite surprisingly, that by operating under the conditions hereinabove stated, substantially no silica in the ore is chlorinated. In other words, unlike the chlorinating techniques heretofore known, the present invention provides a method which substantially eliminates the cumbersome and costly task of removing silicon tetrachloride from the reaction products, in view of the fact that less than 0.5 percent by volume, generally less than 0.1 percent by volume, $SiCl_4$ appears in the exit gases from the reactor.

In addition, the present invention provides a process whereby only a minor amount of or substantially no ferric chloride, i.e. less than one third of the total iron chloride, and generally less than 0.7 percent ferric chloride by weight, is produced by the reaction. Consequently, the greater part of all the iron chloride formed is in the ferrous state. The present invention, therefore, affords a unique advantage over the prior art processes. Such a significant depreciation in the amount of $FeCl_3$ produced is extremely beneficial in that less chlorine goes to produce ferric chloride, which fact represents a very noteworthy saving in chlorine consumption.

Thus, by controlling the feed rates to the reactor, the reaction temperatures, the bed composition, etc., as herein contemplated, a novel process is provided which not only insures complete chlorine consumption but, surprisingly enough, provides reaction product vapors which contain little or no silicon tetrachloride and little ferric chloride. Silicon tetrachloride, as just seen, separates from the titanium tetrachloride-rich product only with additional complications. Both SiCl₄ and FeCl₃, when present in significant quantities in the reaction products, result in very substantial additional costs.

These and many other features of the present invention will be apparent from the following illustrations:

EXAMPLE I

A titanium-bearing material is fed to a shaft furnace of the type shown in FIGURE 1 hereinabove defined, the furnace comprising an outer shell lined with chlorine-resisting brick-work and having an internal diameter of about 7 feet, to establish a bed therein of predetermined height. Near the base of the shaft furnace is a perforated plate, the perforations of which are fitted with orifices of restricted diameter and superimposed by ceramic gas-permeable barriers. The pressure drop across each of these orifices is 7 pounds per square inch. This plate comprises a refractory body, for example, jointed brickwork superimposed onto a steel base plate, the brickwork or a suitable cast refractory and base plate being formed with registering apertures each of which has an upper conical section at the top of which is inserted a disc of porous ceramic material, e.g., silica sand, cemented or lightly sintered. Beneath the base plate, apertured discs are attached to it and defined entrance orifices to the passages leading to the porous ceramic discs. These discs permit the uprising gases to enter the furnace but prevent dust or other solid material from passing downwardly through the plate. Below the plate is a gas chamber having a port through which chlorine gas is admitted. Through the side of the furnace and in the upper portion thereof above the bed, a mixture of the titanium-bearing material and carbon is admitted. Also, on one side of the furnace near the top is provided a port from which the gases leaving the fluid bed are conveyed to a condensing system (not shown).

To commence the process the chlorinator is filled with mineral rutile to a depth of about 2 feet. The bed is then fluidized by the admission of air and fired by means of lances introduced into the reactor through nozzles in the sides of the furnace, these nozzles being of the type shown in the drawing for the introduction of coolant and feed. Having brought the bed temperature to about 700° C., some of the air is substituted with inert gases and coke is added gradually, while at the same time removing some of the lances. At a temperature of about 850° C. enough coke is added to increase the concentration of coke fed up to about 18 percent by weight of the bed and the air and inert gas fluidizing media are substituted with chlorine.

Thereafter, chlorine is fed continuously into the hot mass at a rate of about 2800 pounds per hour to maintain a fluidized bed. During the run it is, at times, necessary to vary the chlorine rate as a result of changing bed conditions which cause the appearance of free chlorine in the off-gases. For example, it is possible to raise the bed temperature by increasing the flow rate. Generally, however, the chlorine flow rate is maintained uniform at about 2800 pounds per hour and at least in the range from 2400 to 3300 pounds per hour.

The rutile-ore-coke mixture is fed to the bed through nozzle 26 shown in the drawing and disposed in the reactor wall at a point above the bed, at the rate of from about 1400 to 3200 pounds per hour for rutile ore and enough coke to maintain a coke concentration of from 18 to 22 percent by weight of the bed. The static bed height is maintained at about 4.5 feet throughout the continuous process by varying the rate of ore-coke mixture fed to the furnace as just mentioned. Bed level or bed height is measured every four (4) hours and the rate of feed adjusted accordingly. Generally, the bed level is not allowed to vary more than one foot each way.

The rutile ore used has the following analysis:

| | Percent by weight |
|---|---|
| TiO₂ | 95.11 |
| CaO | 0.04 |
| Iron (determined as FeO) | 0.78 |
| Nb₂O₅ | 0.39 |
| V₂O₅ | 0.66 |
| Cr₂O₃ | 0.34 |
| ZrO₂ | 0.63 |
| SiO₂ | 1.08 |
| MgO | 0.20 |
| Al₂O₃ | 0.44 |
| MnO | 0.05 |

Tyler screen analysis of the ore is as follows:

| Microns: | Percent by weight |
|---|---|
| 230 | 1.6 |
| 149 | 18.3 |
| 137 | 28.1 |
| 100 | 39.2 |
| 88 | 11.3 |
| 74 | 1.3 |

Tyler screen analysis of the coke is as follows:

| Microns: | Percent by weight |
|---|---|
| 840 | 1.4 |
| 500 | 80.0 |
| 320 | 14.6 |
| 230 | 2.6 |
| 149 | 1.1 |

The temperature of the bed is maintained between 880 and 915° C. throughout the run, generally about 893° C. Quite obviously, as stated hereinabove, the range is occasioned by the fact that it is often desirable throughout the run to diminish the amount of coolant added to the reactor in order to increase the temperature. For instance, when chlorine appears in the off-gases the situation may be remedied by increasing the temperature up to 30 degrees or more. This may be accomplished by augmenting the rate of chlorine flow slightly and/or cutting back on the coolant added to the extent of completely eliminating the addition of coolant.

Titanium tetrachloride coolant, therefore, is added through nozzle 24 at the rate from 0 to 2000 pounds per hour, generally about 1200 pounds per hour.

Every 48 hours or so the bed is analyzed for TiO₂ concentration. After about 400 hours from the start of the operation the TiO₂ concentration in the bed is below about 50 percent by weight and chlorine gas appears in the off-gases. At that time about one-third of the bed is purged through outlet 28 in the bottom of the reaction zone and the bed is made up with fresh feed.

In addition, a chlorine analysis of the off-gases is made every 8 hours. Whenever chlorine appears in these gases, adjustment of the reaction conditions as above is required. A TiO₂ concentration in the bed of less than 30 percent by weight is almost invariably attended by poor chlorine consumption. Chlorine generally appears in the off-gases whenever the TiO₂ concentration dips below 50 percent by weight. This situation is readily remedied by purging in the manner shown above.

The following table is an excerpt from a continuous operating run taken after a prolonged period of operation and typifies the conditions maintained to avoid and eliminate the presence of chlorine in the off-gases. Chlorine analyses are taken of the "tail gases" emitted from the second of two consecutive pipe-packed tower condensers in which the off-gases from the chlorinator are condensed. The first condenser is operated at a temperature between 24 and 38° C. and the second at a temperature between −17 and −2° C.

Table

| Running Time, Consecutive Hours | Ore Fed in Pounds per Hour | Coke Feed, Pounds per Hour | Chlorine Flow, Pounds per Hour | Bed Level in Feet | Coke in Bed, Percent by Weight | Temperature in Chlorinator (Above Bed) °C. | TiCl₄ Coolant in Pounds per Hour | Chlorine in Tail Gas in Percent by Volume |
|---|---|---|---|---|---|---|---|---|
| 1 (not the first hour of operation) | 2,000 | 300 | 2,800 | 4½ | | 887.78 | 1,200 | 0 |
| 2 | 2,000 | 300 | 2,800 | | | 898.89 | 1,700 | |
| 3 | 2,000 | 300 | 2,800 | | | 887.78 | 1,200 | |
| 4 | 2,000 | 300 | 2,800 | | | 893.33 | 1,200 | |
| 5 | 2,100 | 300 | 2,790 | 4⅙ | 18 | 893.33 | 1,200 | |
| 6 | 2,100 | 300 | 2,800 | | | 898.89 | 1,400 | |
| 7 | 2,100 | 300 | 2,800 | | | 898.89 | 1,400 | |
| 8 | 2,100 | 300 | 2,800 | | | 898.89 | 1,400 | |
| 9 | 2,100 | 350 | 2,800 | 4 | 17 | 893.33 | 1,400 | 1.3 |
| 10 | 2,200 | 350 | 2,800 | | | 898.89 | 0 | purge |
| 11 | 2,200 | 350 | 2,800 | | | 893.33 | 10 | 2.6 |
| 12 | 2,200 | 350 | 2,800 | | | 898.89 | 1,400 | 0.4 |
| 13 | 2,200 | 350 | 2,800 | 4⅙ | 21 | 893.33 | | |
| 14 | 2,200 | 350 | 2,800 | | | 904.44 | 1,500 | |
| 15 | 2,200 | 350 | 2,800 | | | 898.89 | 1,200 | |
| 16 | 2,200 | 350 | 2,800 | | | 893.33 | 1,000 | purge |
| 17 | 2,200 | 350 | 2,800 | 4¼ | 21 | 887.78 | | 0.6 |
| 18 | 2,200 | 350 | 2,800 | | | 898.89 | 1,400 | |
| 19 | 2,200 | 350 | 2,800 | | | 904.44 | 1,200 | |
| 20 | 2,200 | 375 | 2,800 | 4 9/12 | 16 | 898.89 | 1,300 | |
| 21 | 2,200 | 375 | 2,800 | | | 904.44 | 1,100 | |
| 22 | 2,200 | 375 | 2,800 | | | 898.89 | 950 | 0 |

Referring now to the above table, upon the appearance of chlorine in the tail gas at the ninth (9) hour and the simultaneous decrease in TiO₂ concentration to below 50 percent by weight of the bed (exclusive of the carbon content), part of the bed is purged and the bed replenished. A single purge not being enough to eliminate chlorine from the tail gas, a further purge is made at the sixteenth (16) hour and the bed replenished, both purges amounting to about one-third of the whole bed.

It will be noted (see twenty-second hour) that complete consumption of chlorine in the reaction is achieved by these purges which, in effect, increase the TiO₂ concentration in the bed as explained hereinabove.

While the present invention has been defined with particular reference to details of specific embodiments thereof, it is not intended that such details be regarded as limitations upon the scope of the invention, except insofar as included in the accompanying claims.

This application is a continuation-in-part of U.S. Serial No. 449,002, now abandoned, filed August 10, 1954, U.S. Serial No. 509,964, filed May 20, 1955, now U.S. Patent 2,855,273, dated October 7, 1958, and U.S. Serial No. 469,062, filed November 15, 1954, now abandoned.

We claim:

1. In a process for the production of titanium tetrachloride from a material which contains iron and titanium in oxide form and impurities in the form of a member of the group consisting of zircon and silica, the improvement which comprises establishing a fluidized bed of said material, passing an upwardly rising stream of chlorine through said bed at a rate high enough to fluidize the bed but low enough so that substantially no free chlorine appears in the vapor escaping from the bed, maintaining the temperature of the bed sufficiently high to form and vaporize iron and titanium chlorides and sufficiently low to retain and accumulate in the bed said impurities and regulating the formation and vaporization of iron and titanium chlorides by periodically analyzing the product vapors for chlorine, and when free chlorine persists therein reconstituting the composition of the bed by removing a portion thereof, including said accumulated impurities, and increasing the titanium dioxide concentration of the bed to form product vapors containing substantially no free chlorine.

2. The process of claim 1 wherein the titanium oxide in the bed after increased concentration thereof is above about 30 percent by weight.

3. The method of claim 1 wherein the composition of the bed is reconstituted when free chlorine persists in the vapor by purging and replenishing the bed so that the titanium oxide concentration thereof is increased to above 30 percent by weight.

4. In a process for the production of titanium tetrachloride from a material which contains titanium in oxide form and a siliceous impurity, the improvement which comprises establishing a fluidized bed of said material, passing an upwardly rising stream of chlorine through said bed at a flow rate in excess of the minimum required fluidizing velocity, but low enough so that substantially no free chlorine appears in the vapors escaping from the bed, maintaining the temperature of the bed sufficiently high to form and vaporize titanium tetrachloride from the bed and sufficiently low to retain in the bed siliceous impurity, so as to accumulate siliceous impurity in the bed, and regulating the formation and vaporization of titanium chloride by periodically analyzing the product vapors for chlorine, and when free chlorine persists therein reconstituting the composition of the bed by removing a portion thereof including said accumulated siliceous impurity, and increasing the titanium oxide concentration of the bed until substantially no free chlorine appears in the vapors.

5. The method of claim 4 including continuing chlorination and analyses of vapors until a period of chlorination is reached during which free chlorine persists in the vapors and then reconstituting the composition of the bed by removing a portion thereof including said siliceous impurity and increasing the titanium oxide concentration of the bed until the free chlorine in the vapor falls to less than about 0.05 percent by volume, so that there is substantially no free chlorine in said vapors during at least 75 percent of the chlorination.

6. The process of claim 4 wherein theh titanium-bearing material is an iron-titanium bearing material and iron chloride vapors are produced in addition to titanium tetrachloride, a greater part of all the iron chloride formed being in the ferrous state.

7. In a process for the production of titanium tetrachloride from a material which contains iron and titanium in oxide form and impurities in the form of a member of the group consisting of zircon and silica, the improvement which comprises establishing a fluidized bed of said material having a titanium dioxide content above about 50 percent by weight thereof, passing an upwardly rising stream of chlorine through said bed at a rate high enough to fluidize the bed but low enough so that substantially no free chlorine appears in the vapor escaping from the bed, maintaining the temperature of the bed sufficiently high to form and vaporize iron and titanium chlorides and sufficiently low to retain and accumulate in the bed said impurities, and adjusting the concentration of titanium dioxide in the bed to provide that substantially no free chlorine is escaping from the bed by periodically analyzing the bed for titanium dioxide and periodically reconstituting the composition of the bed by removing a portion thereof, including said accumulated impurities, and increasing the titanium dioxide concentration of the bed so that the titanium dioxide content in the bed is maintained above about 50 percent by weight thereof.

References Cited in the file of this patent

UNITED STATES PATENTS

| | | |
|---|---|---|
| 2,701,179 | McKinney | Feb. 1, 1955 |
| 2,701,180 | Krchma | Feb. 1, 1955 |
| 2,784,058 | Hair | Mar. 5, 1957 |
| 2,790,703 | Frey | Apr. 30, 1957 |
| 2,855,273 | Evans et al. | Oct. 7, 1958 |

UNITED STATES PATENT OFFICE
CERTIFICATE OF CORRECTION

Patent No. 3,086,843                                            April 23, 1963

Arthur W. Evans et al.

It is hereby certified that error appears in the above numbered patent requiring correction and that the said Letters Patent should read as corrected below.

Column 2, line 30, for "temperaure" read -- temperature --; column 4, line 1, for "chloride" read -- chlorine --; column 6, line 6, for "oxide" read -- dioxide --; column 14, line 60, for "theh" read -- the --.

Signed and sealed this 18th day of August 1964.

(SEAL)
Attest:

ERNEST W. SWIDER                                           EDWARD J. BRENNER
Attesting Officer                                             Commissioner of Patents